United States Patent [19]

Rinfret et al.

[11] 4,273,297

[45] Jun. 16, 1981

[54] APPARATUS FOR CRUSHING FRANGIBLE ARTICLES

[76] Inventors: John H. T. Rinfret; Elizabeth M. Rinfret, both of The Grange, West Ashby, Horncastle, Lincolnshire, England

[21] Appl. No.: 60,025

[22] Filed: Jul. 24, 1979

[30] Foreign Application Priority Data

Jul. 26, 1978 [GB] United Kingdom ............... 31168/78

[51] Int. Cl.³ .............................................. B02C 1/00
[52] U.S. Cl. ............................. 241/99; 100/DIG. 2; 241/100; 241/283
[58] Field of Search ................ 241/99, 100, 168, 169, 241/169.1, 199.2–199.8, 198 A, 264, 283, DIG. 27; 100/257, 293, DIG. 2

[56] References Cited

U.S. PATENT DOCUMENTS

| | | | |
|---|---|---|---|
| 2,176,552 | 10/1939 | Vocaturo | 241/99 X |
| 2,439,725 | 4/1948 | Frost | 100/257 UX |
| 2,904,268 | 9/1959 | Chappell et al. | 241/100 X |
| 3,151,814 | 10/1964 | Morgan et al. | 241/99 |
| 3,503,327 | 3/1970 | Lenz | 100/257 |
| 3,756,520 | 9/1973 | Hughes | 241/100 |

FOREIGN PATENT DOCUMENTS 448960 6/1936 United Kingdom .
472740 9/1937 United Kingdom .
1141244 1/1969 United Kingdom .

*Primary Examiner*—Howard N. Goldberg

[57] ABSTRACT

An apparatus for crushing frangible articles, such as pill bottles, which includes a housing, a support plate mounted within the housing, and a roller movably positioned within the housing so as to be reciprocable in an arcuate path past the support plate and thereby crush any frangible articles located thereon. The support plate is adjustable in position relative to the roller to facilitate the crushing of articles of different sizes. A drawer is removably mounted within the housing below the support plate for collecting the fragments of the crushed articles.

7 Claims, 1 Drawing Figure

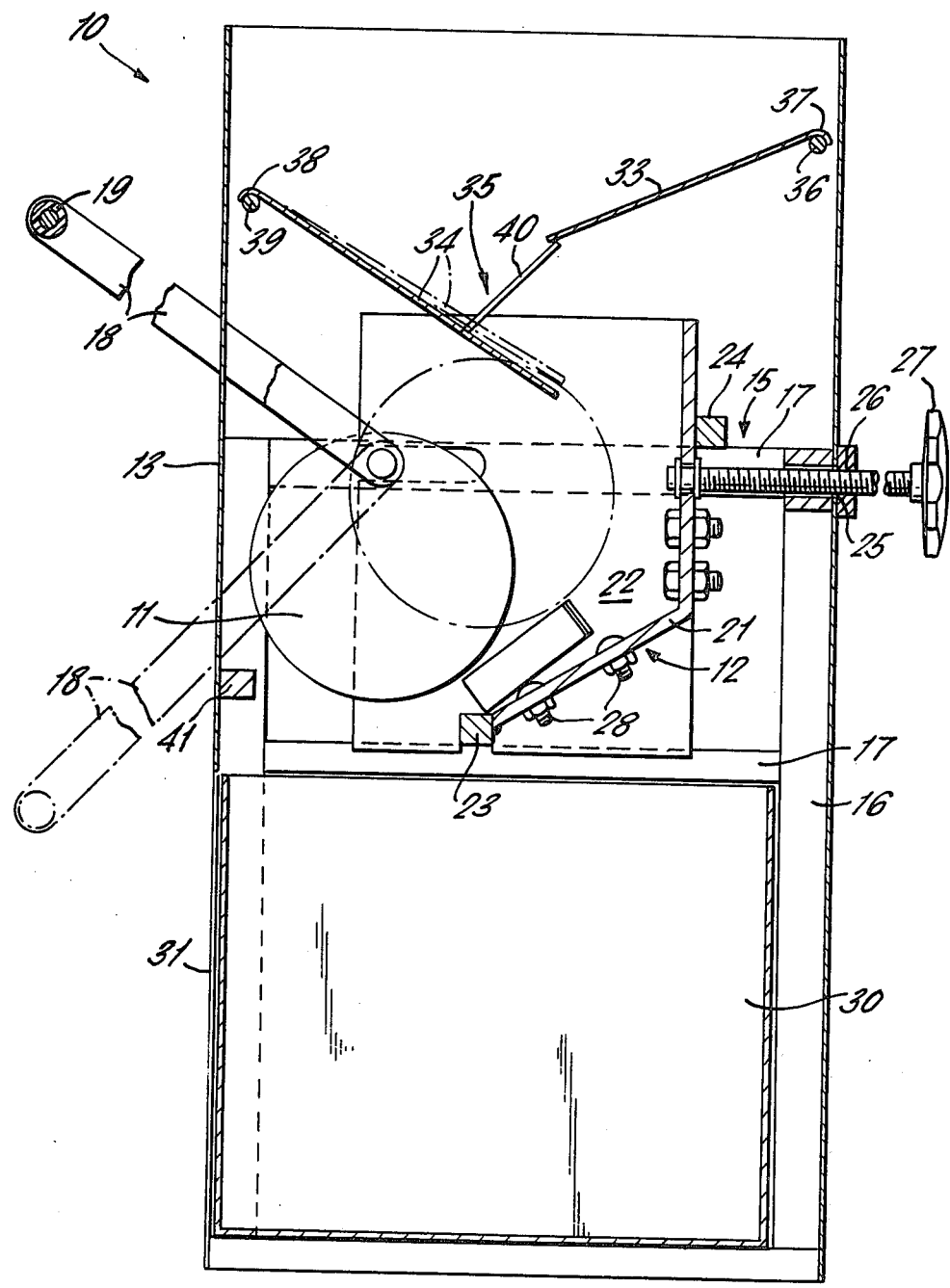

APPARATUS FOR CRUSHING FRANGIBLE ARTICLES

SUMMARY OF THE INVENTION

The present invention relates to an apparatus for crushing frangible articles, for example, pill bottles and phials.

The inventive apparatus comprises a housing, a surface within the housing for supporting articles to be crushed, a crushing element mounted in the housing and movable in a predetermined path towards and away from the support surface so as to crush the articles, and an adjustment mechanism for moving the support surface so as to change the distance between the support surface and the crushing element as desired.

Preferably the crushing element comprises a roller which is pivoted within the housing for movement about an axis adjacent to a part of the periphery of the roller.

The support surface may include a generally planar surface portion, with the crushing roller being located such that a point on the periphery of the crushing roller will describe an arcuate path of travel past the planar surface portion as the crushing roller is pivoted.

In this case, a handle is provided which is fixedly attached to the crushing roller for manual reciprocation thereof.

Preferably the support surface is a plate and the adjustment mechanism includes a screw-threaded member which is connected to the plate for sliding the plate within the housing.

Preferably the support surface is arranged to permit the discharge of crushed articles from the surface thereof by gravity, whereas a stop element is provided for preventing uncrushed articles from falling from the supporting surface.

A receptacle for crushed articles may be provided beneath the support surface, the crushed articles discharging into the receptacle by gravity.

Suitable elements may be provided for defining an inlet opening into the housing, and these elements may include at least one movable plate portion, the arrangement being such that reciprocation of the crushing element causes movement of the plate portion so as to assist the ingress of articles to be crushed onto the support surface.

A preferred embodiment of the invention will now be described, by way of example, with reference to the accompanying FIGURE which shows a section in a vertical plane through a crushing apparatus according to the invention.

DETAILED DESCRIPTION OF THE PREFERRED EMBODIMENT

A crushing apparatus 10 for crushing frangible articles comprises a crushing roller 11 which is movable relative to a support member 12 for articles to be crushed, the roller 11 and support member 12 being mounted within a housing 13.

The housing 13 is a generally tubular metal casing of rectangular cross-section arranged with its axis vertical. The housing may include attachment means such as lugs (not shown) for fixing the apparatus to a base plate, wall surface or other support such as a trolley.

Within the housing 13 is a framework 15 of bars which are rigidly connected together for supporting the roller 11 and support member 12. The framework 15 consists of vertical bars 16 in the corners of the housing extending from the bottom of the housing for approximately two-thirds of its height and horizontal bars 17 which connect the vertical bars at their tops in a plane a short distance below the centre of the housing.

The crushing roller 11, which may be a solid or a hollow rigid roller preferably made of steel, is pivoted about an axis adjacent its periphery between the two upper bars 17 extending along the longer sides of the housing. An operating handle 18 for pivoting the roller 11 comprises two bars rigidly attached at one end to the roller and extending through slots (not shown) in the housing 13 and connected at their free ends by a grip 19.

The support member 12 comprises a bent plate 21 supported between and rigidly fixed to rectangular side plates 22 (only one of which is shown in the drawing). The upper portion of plate 21 is vertical and the lower portion is at approximately 30° to the horizontal. A square-section bar 23 fixed between the side plates 22 at the lower edge of the bent plate 21 acts as a stop for frangible articles to be crushed as will be described below. Bolts 28 fastened through the plate 21 provide irregularities in its surface which aid crushing.

The support member assembly 12 is movable left and right as viewed in the FIGURE to vary the distance between plate 21 and the roller 11. For this purpose, the support member 12 includes a bar 24, the ends of which slide along the longer upper bars 17 and a screw-threaded rod 25, one end of which is fixed to the plate 21 and the other end of which extends through a threaded hole 26 in the housing 13 and terminates in a knob 27.

Beneath the roller 11 and support member 12 within the housing 13 is a drawer 30 into which the fragments of shattered articles fall. The drawer is slidable in and out of the housing 13 through an aperture 31 for the purpose of emptying it.

In the upper part of the housing 13, above the roller 11 and support member 12, are two guide plates 33, 34, which define between them an inlet aperture 35 for the ingress of articles to be crushed to the support member. The guide plates also act as a shield for flying fragments of crushed articles.

Guide plate 33 is hingedly supported by a rod 36 extending across the housing, a bent-over edge portion 37 of the guide plate forming a hook which engages the rod 36.

Guide plate 34 also has a hook edge portion 38 which engages a rod 39 to hingedly support plate 34, the opposite edge of plate 34 being unsupported. The plate 34 includes slots (not shown), the ends of which engage side walls 22 so that the plate 34 is supported as shown in the drawing and the edge portions 40 of the plate 34 are bent upwardly to support the lower edge of plate 33.

The use of the crushing apparatus 10 is as follows. The basic crushing action is effected by manual reciprocation of the handle 18 between the two positions shown in the drawing, the movement downwards of the handle being limited by a stop bar 41. As the roller 11 is pivoted between the two positions shown, its periphery adjacent to plate 21 describes an arcuate path, moving towards and away from the angled portion of plate 21 as well as moving in a direction parallel to the plate. At approximately the mid-point of this movement, the distance between the plate 21 and the periphery of the roller 11 reaches a minimum and the support member 12 is manually adjusted by knob 27 prior to use of the apparatus so that this minimum distance is slightly less than the thickness of the articles to be crushed (or the smallest article if a range of sizes of articles are to be crushed).

The article to be crushed is dropped into the housing 13 between the plates 33, 34, and if it is small, slides down plate 21 until it comes to rest against stop 23. Reciprocation of handle 18 then causes the roller to crush the article and the fragments fall into drawer 30, any fragments or plastic caps of the articles being swept off plate 21 on the return stroke of the roller. The apparatus is particularly suitable for crushing pill bottles, phials and the like, although, with suitable adjustment of support member 12, a wide range of frangible articles may be accommodated. It will be appreciated that the sweeping action of the return stroke of the roller ensures that the apparatus does not become blocked by plastic caps (which are not crushed) of pill bottles while the arcuate forward stroke effectively crushes the bottles.

It will also be observed that the roller at the uppermost part of its path of travel contacts the free edge of plate 34 and lifts the plate as shown in chain dot lines in the drawing and also the plate 33 by contact between plate 33 and the portion 40 of plate 34. This has the effect of "shaking down" the articles onto the plate 21 when a stream of articles is being fed into the apparatus.

It will be appreciated that the invention is not limited to the details described above and various modifications may be made within the scope of the invention. For example, when a large number of articles of similar sizes are to be crushed, the support member may be preset for the smallest article and the articles then poured into the housing in a continuous stream. In this case, the reciprocation of the handle 18 may be effected automatically rather than manually by a motor driving a crank or other suitable mechanical, pneumatic or hydraulic means.

Furthermore, the roller 11 may be of square, rectangular or other cross-sectional shape rather than circular.

Still further, the support member 12 may be a single curved plate, a flat plate with a protecting pin for returning articles to be crushed, or other shapes, the shape of the support member being selected according to the proposed use of the machine and in particular being governed by the maximum and minimum size of articles intended to be crushed.

Still further, two rollers 11 may be provided mounted on a common axis and aligned with two support members 12 of different shapes so that different articles may be crushed simultaneously.

We claim:

1. Apparatus for crushing frangible articles comprising a housing; a support plate mounted within the housing, said support plate including a planar surface for supporting articles to be crushed; a crushing member having a crushing surface portion mounted in the housing; means for rotating said crushing member about an axis generally parallel to said planar portion of the support plate such that, in use, rotation of the crushing member about the axis moves said surface portion of the crushing member in an arcuate path towards, along and away from the planar surface of the support plate to crush the articles therein, a tangent to the path at one point being parallel to said planar portion of the support plate; and means connected to said support plate for moving said support plate towards or away from the crushing member to adjust the distance between the support plate and said tangent to the arcuate path.

2. Apparatus as claimed in claim 1 in which the crushing member is a roller, the axis of rotation thereof being located adjacent to a part of its periphery.

3. Apparatus as claimed in claim 2 in which said means for rotating said crushing member includes a handle attached to the roller for manual reciprocation thereof.

4. Apparatus as claimed in claim 1 in which the support plate is slidable in the housing and a screw-threaded member is connected to the plate for sliding the plate.

5. Apparatus as claimed in claim 1 in which the planar surface of the support plate is inclined at an acute angle to the horizontal to permit the discharge of crushed articles by gravity, and a stop means is provided at the lower portion of said planar surface for preventing uncrushed articles falling from the plate.

6. Apparatus as claimed in claim 5 further comprising a receptacle removably located in the housing beneath the support plate for receiving the crushed articles, the crushed articles discharging into the receptacle by gravity.

7. Apparatus as claimed in claim 1 further comprising means defining an inlet opening into the housing for articles to be crushed.

* * * * *